US006400518B1

United States Patent
Bhaumik et al.

(10) Patent No.: US 6,400,518 B1
(45) Date of Patent: Jun. 4, 2002

(54) MAGNETO-RESISTIVE ASYMMETRY CORRECTION CIRCUIT

(75) Inventors: Jaydip Bhaumik; Robert Andrew Kertis, both of Rochester, MN (US); Klaas Berend Klaassen, San Jose, CA (US); Raymond Alan Richetta, Rochester, MN (US); Jacobus Cornelis Leonardus Van Peppen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/702,618

(22) Filed: Nov. 1, 2000

(51) Int. Cl.$^7$ .................................................. G11B 5/02
(52) U.S. Cl. ............................. 360/25; 360/46; 360/67
(58) Field of Search ............................. 360/25, 46, 67, 360/53

(56) References Cited

U.S. PATENT DOCUMENTS

| 5,787,005 | A | | 7/1998 | Millerd, Jr. et al. |
| 5,943,177 | A | | 8/1999 | Mathews et al. |
| 5,986,831 | A | | 11/1999 | Muto |
| 5,999,349 | A | | 12/1999 | Choi |
| 6,043,943 | A | | 3/2000 | Rezzi et al. |
| 6,052,245 | A | | 4/2000 | Sugawara et al. |
| 6,072,647 | A | | 6/2000 | Hiramatsu |
| 6,191,908 | B1 | * | 2/2001 | Tachiyawa .................. 360/67 |

FOREIGN PATENT DOCUMENTS

| JP | 6231410 | 8/1994 |
| JP | 10214403 | 8/1998 |

OTHER PUBLICATIONS

"An Input Stage Transconductance Reduction Technique for High–Slew Rate Operational Amplifiers", IEEE Journal of Solid–State Circuits, By Schmook, vol. SC–10, No. 6, Dec. 1975, pp. 407–411.*

* cited by examiner

Primary Examiner—Alan T. Faber
(74) Attorney, Agent, or Firm—Christopher H. Lynt; James R. Nock

(57) ABSTRACT

A circuit arrangement for correcting magneto-resistive head asymmetry includes a shift circuit which receives a read signal from a magneto-resistive head, and a polarity signal indicative of the polarity of any asymmetry of the read signal. Depending on the polarity of the asymmetry, the shift circuit either adds or subtracts a shift voltage to the read signal to produce a shifted read signal. The shift circuit outputs the read signal, the shifted read signal, and the shift voltage. First, second and third gain circuits are provided, which receive the read signal, the shifted read signal, and the shift voltage, respectively, and which each receive a respective control signal. The first, second and third gain circuits provide respective outputs amplified proportionally based on the respective control signals. Control circuitry provides the polarity signal to the shift circuit and the respective control signals to the first, second and third gain circuits, based on an amount of correction required. A common-mode-feedback circuit adjusts for changes in the common-mode caused by the waveform shaping.

17 Claims, 4 Drawing Sheets

Block Diagram of the MR Asymmetry Circuit

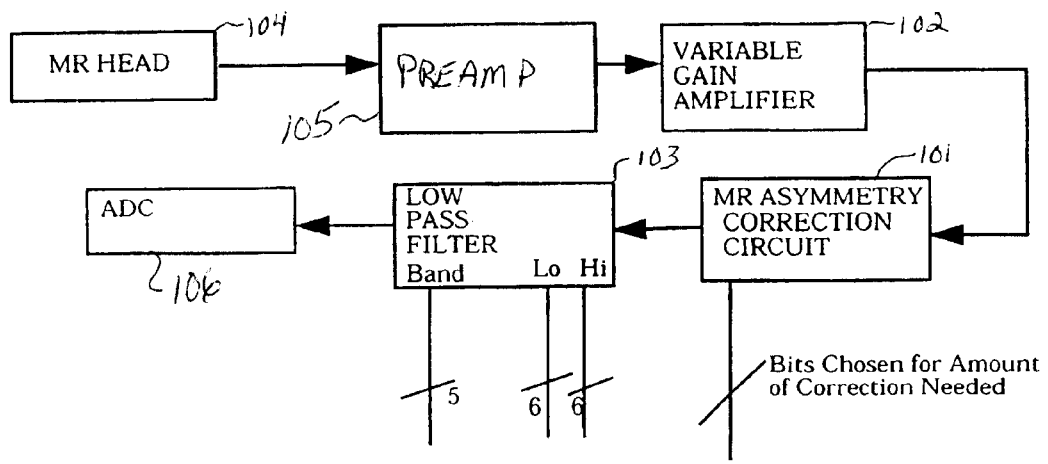
Figure 1  MR ASYMMETRY CORRECTION DIAGRAM
Asymmetry of a waveform such as the one shown below is given by the equation:
$$Asymmetry = \left(\frac{MAX - MIN}{MAX}\right)$$
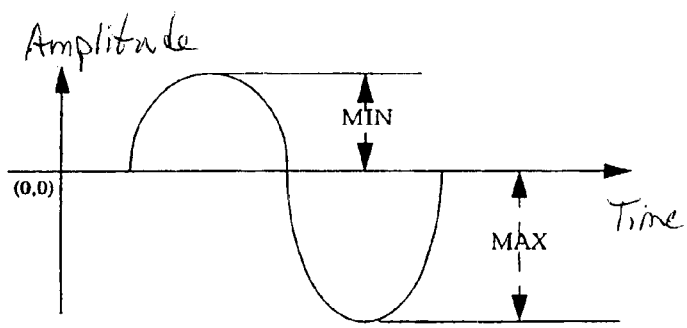
Figure 2  NEGATIVE ASYMMETRY

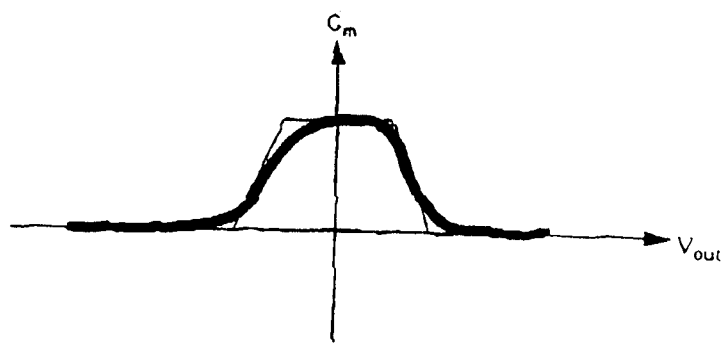
Figure 3     GM Characteristics of a linearized Differential Pair
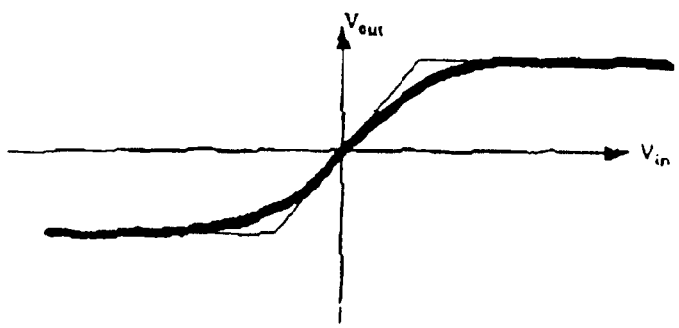
Figure 4     $V_{out}$ vs. $V_{in}$ Characteristic of a linearized Differential Pair
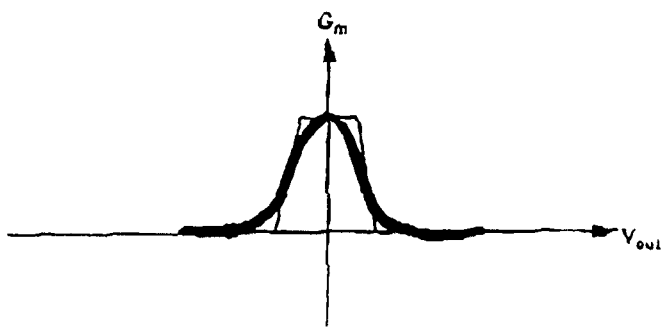
Figure 5     GM Characteristic of a Non-linearized Differential Pair
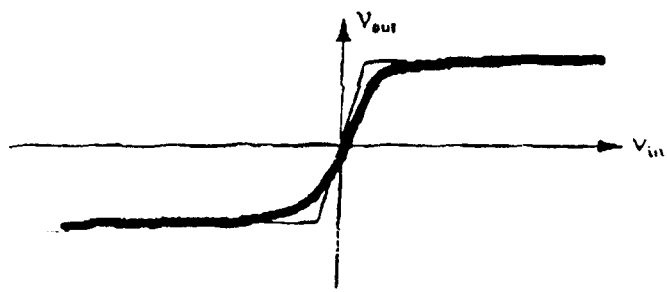
Figure 6     $V_{out}$ vs. $V_{in}$ Characteristic of a Non-linearized Differential Pair

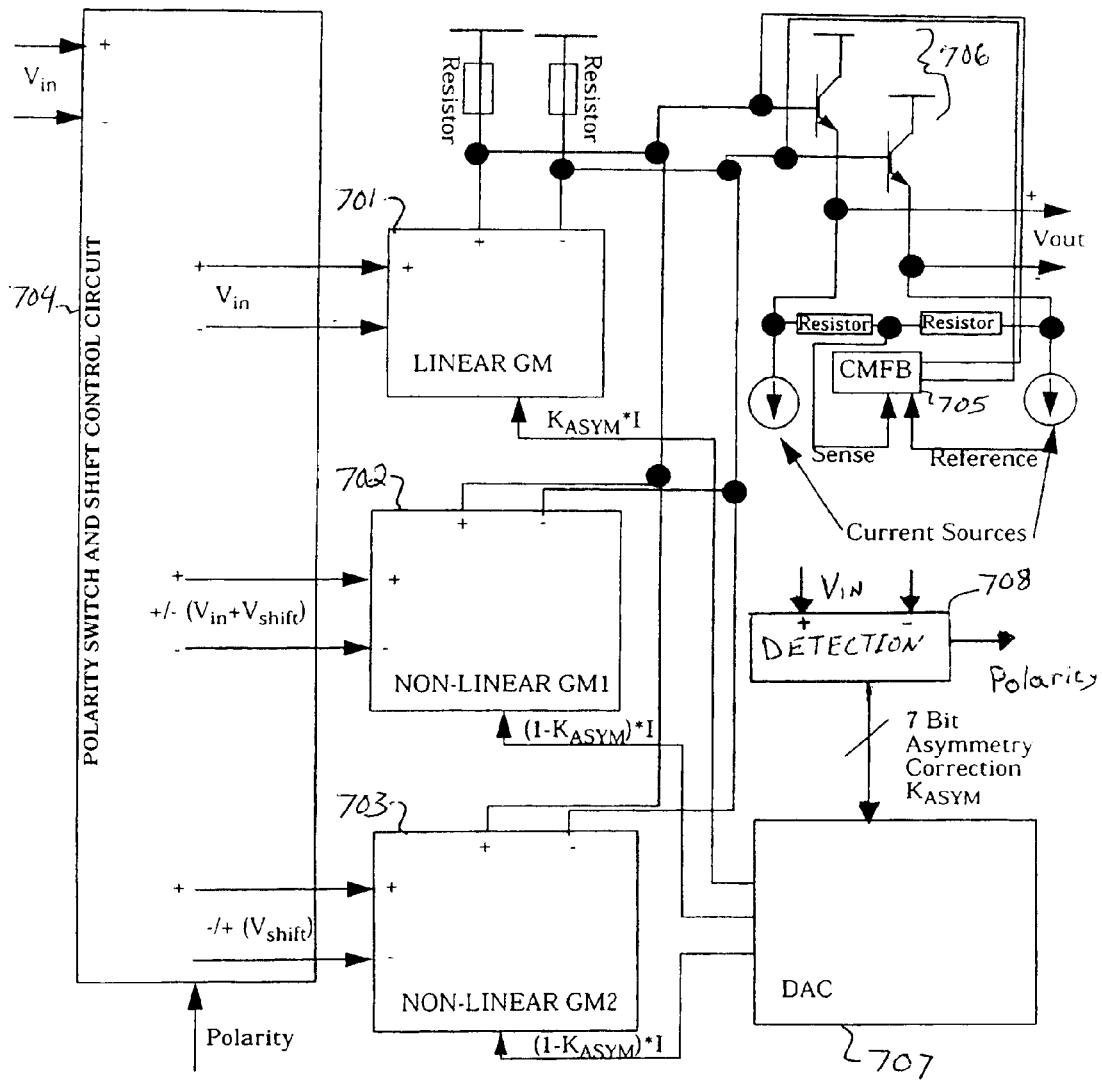
Figure 7  Block Diagram of the MR Asymmetry Circuit

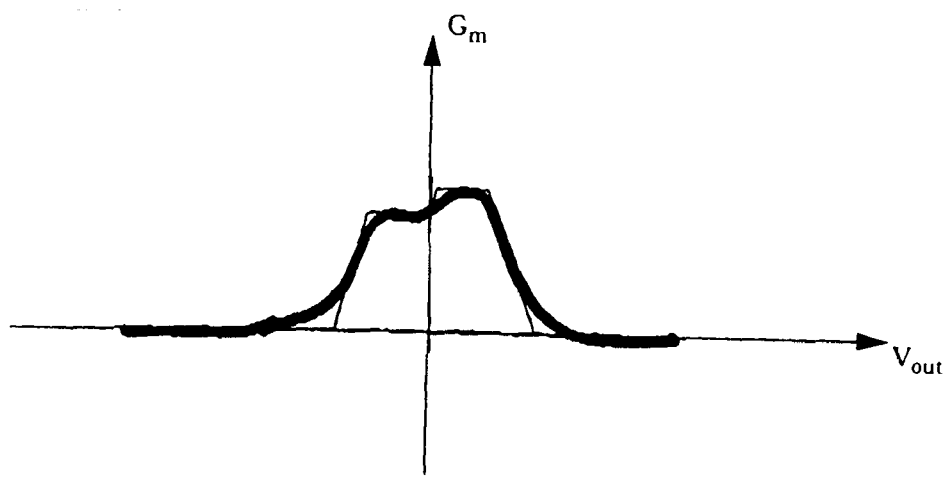
Figure 8    GM Characteristic of the MR Asymmetry Circuit
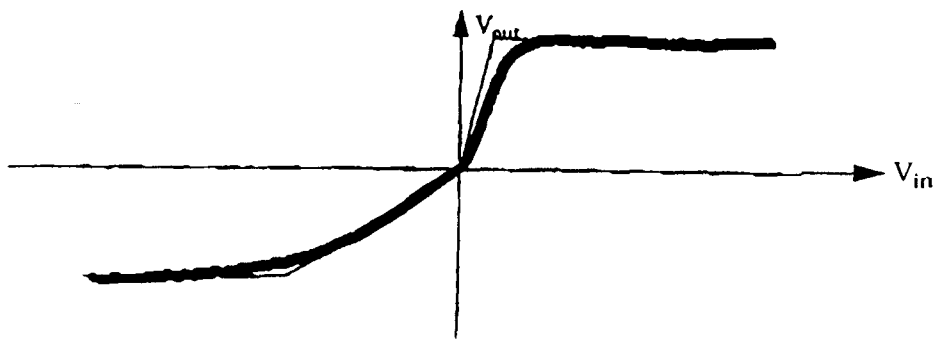
Figure 9    $V_{out}$ vs. $V_{in}$ Characteristic of the MR Asymmetry Circuit
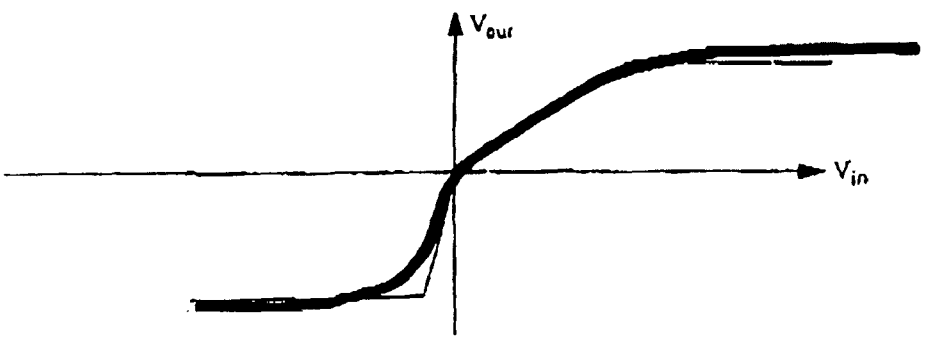
Figure 10    $V_{out}$ vs. $V_{in}$ Characteristic of the MR Asymmetry Circuit

MAGNETO-RESISTIVE ASYMMETRY CORRECTION CIRCUIT

BACKGROUND OF THE INVENTION

1. Field of the Invention

The invention relates to the field of magneto-resistive heads, and in particular, to circuitry for correcting asymmetry in the output (read signal) from these heads.

2. Background Information

The magneto-resistive heads currently used in disk-drives sometimes produce asymmetric pulses due to various reasons which include temperature and bias point variation.

Asymmetry of a waveform such as the one shown in FIG. 2 is given by the equation:

Asymmetry=(MAX−MIN)/MAX

So for example if MIN is 30 mV and MAX is 60 mV (absolute value), the asymmetry would be 50%. This would be defined as negative asymmetry (shown in FIG. 2).

The problem of asymmetry has been solved before using circuit techniques. The purpose of a correction circuit is to take such an asymmetric waveform and shape it such that the positive and negative pulses are equal (i.e. symmetrical).

U.S. Pat. No. 6,072,647, shows a method of correcting MR Head Asymmetry by changing the bias current in the head. This is based on a reproduced signal.

U.S. Pat. No. 6,043,943 (also Japanese Patent No. 10-214403) shows a method of asymmetry correction which requires matching delay lines.

U.S. Pat. No. 5,943,177, shows a method of defection of asymmetry and a method of correction based on peak detection and rectifier circuits. Also, the method includes separating the positive and the negative lobes of the signal.

JAPANESE Patent No. JP623410, shows a method of correction which changes the bias current in the MR head.

U.S. Pat. No. 6,052,245, describes a detection method which is a delay-based, digital implementation of the squaring method of correction of asymmetry.

U.S. Pat. No. 5,999,349, describes a digital way of correcting asymmetry. This patent describes a method in which tap weights are changed to change the waveform shape. This method of correction of asymmetry is complicated.

U.S. Pat. No. 5,986,831, deals with MR asymmetry detection which uses a digital filter to differentiate samples into states and then uses circuits to create an equalized waveform.

U.S. Pat. No. 5,787,005, describes a method based on peak-hold circuits.

Many of the prior asymmetry correction schemes depend on changing head bias current or using matching delay lines for their correction to work, so the performance is very much dependent on layout and process parameters, which are hard to control.

Therefore, a need exists for an improved asymmetry correction circuit which is independent of layout and process parameters which are hard to control, and therefore, overcomes the problems and limitations of the prior art.

SUMMARY OF THE INVENTION

It is, therefore, a principle object of this invention to provide a magneto-resistive asymmetry correction circuit.

It is another object of the invention to provide a magneto-resistive asymmetry correction circuit that solves the above mentioned problems so that asymmetric pulses from magneto-resistive heads are corrected simply and effectively.

These and other objects of the present invention are accomplished by the method and apparatus disclosed herein.

According to an aspect of the invention, an implementation of an exemplary embodiment is well-suited for a read channel in BICMOS technology because of its range of correction and the size of the actual circuits.

According to an aspect of the invention, an exemplary embodiment has been shown to be effective in both laboratory and simulation.

According to an aspect of the invention, an exemplary embodiment advantageously increases magneto-resistive (MR) head yield since placing the circuit in the read path tolerates larger head asymmetries and is capable of obtaining acceptable error rates on drives. By being able to ship heads with larger asymmetry, component yield can be increased.

According to an aspect of the invention, correcting asymmetry is advantageously achieved, not just detection or measurement of an amount of asymmetry.

According to an aspect of the invention, an exemplary embodiment of the present invention advantageously does not involve changing biasing conditions in the magneto-resistive (MR) head. Instead, the exemplary embodiment uses a novel way of analog wave shaping by employing non-linear and linear differential stages in the read channel.

According to an aspect of the invention, an exemplary embodiment corrects asymmetry such that the positive and negative pulses are equal.

According to an aspect of the invention, an exemplary embodiment corrects asymmetry in a very different way than has previously been done. In contrast to known asymmetry correction circuits, which depend on matching delay lines for their correction to work, and exemplary embodiment of the present invention does not require matching delay lines. Therefore, the performance of the exemplary embodiment of the present invention is independent of layout and process parameters which are hard to control.

According to an aspect of the invention, an arrangement for correcting magneto-resistive head asymmetry, includes a shift circuit which receives a magneto-resistive head read signal, and a polarity signal indicative of the polarity of any asymmetry of the read signal. Depending on the polarity of the asymmetry, the shift circuit either adds or subtracts a shift value to the read signal to produce a shifted read signal. The shift circuit outputs the read signal, the shifted read signal, and the shift value. First, second and third gain circuits, receive the read signal, the shifted read signal, and the shift value, respectively, and each receive a respective control signal. The first, second and third gain circuits provide respective outputs amplified in accordance with the respective control signals.

According to an aspect of the invention, the respective control signals and the polarity signal are derived from the read signal by control means, the control means receiving the read signal, detecting a polarity of any asymmetry of the read signal, and providing the polarity signal to the shift circuit and the respective control signals to the first, second and third gain circuits, based on an amount of correction required.

According to an aspect of the invention, a common mode adjustment means is provided for receiving the respective outputs from the first, second and third gain circuits, as a combined output, and for correcting any common mode effect in the combined output. The common mode adjustment means includes a common mode feedback circuit. A pair of emitter followers is provided for receiving the respective outputs from the first, second and third gain circuits, and providing the combined output to the common mode adjustment means.

According to an aspect of the invention, the control means includes detection means for receiving the read signal, detecting any asymmetry in the received read signal and the polarity of any asymmetry, producing the polarity signal, and producing a digital correction signal indicative of an amount of asymmetry correction required, and a digital to analog converter for receiving the digital correction signal and producing the respective control signals to the first, second and third gain circuits, based on an amount of correction required.

According to an aspect of the invention, the first, second and third gain circuits include differential amplifier pairs having certain transconductance characteristics which can be changed by adding current to one side of the differential pair. These amplifier pairs are differential bipolar transistor pairs in one embodiment.

According to an aspect of the invention, a method of correcting asymmetry in a read signal from a magneto-resistive head, includes detecting an amount of asymmetry in the read signal, and the polarity of the asymmetry detected, and producing a corrected read signal by combining the outputs of first second and third gain stages. The first gain stage is a linear gain stage which receives the read signal unaltered, the second gain stage is a non-linear gain stage which receives the read signal altered by a shift value in accordance with the polarity of the asymmetry detected, and the third gain stage receives the shift value. The gain stages have a respective gain thereof controlled based on the asymmetry detected.

These and other aspects of the invention will become apparent from the detailed description set forth below.

DETAILED DESCRIPTION OF THE PREFERRED EMBODIMENTS(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

As already explained, the magneto-resistive (MR) heads currently used in disk-drives sometimes produce asymmetric pulses due to various reasons which include temperature and bias point variation. The purpose of the invention implemented in the exemplary circuit described below, is to take such an asymmetric waveform and shape it such that the positive and negative pulses are equal (i.e. symmetrical). That is, correcting asymmetry is advantageously achieved, not just detection or measurement of an amount of asymmetry.

Figure 1:
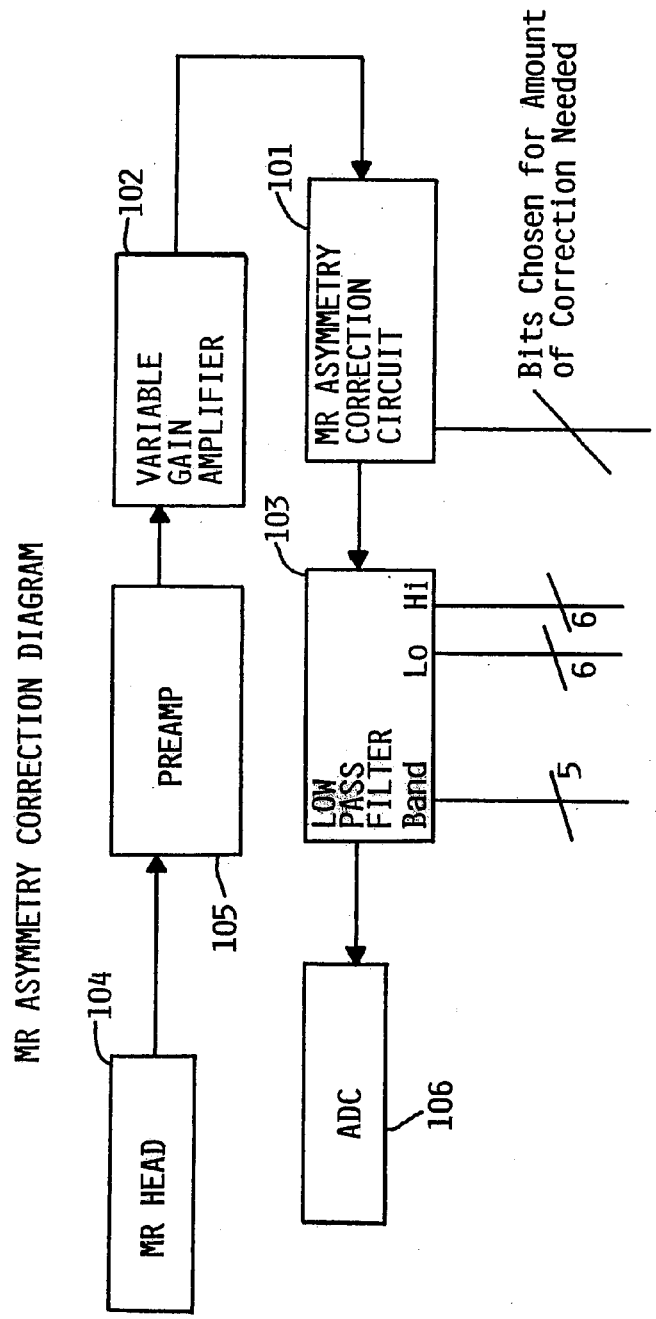
FIG. 1 illustrates a block diagram of a magneto-resistive head asymmetry correction arrangement according to an exemplary embodiment of the present invention.
Figure 2:
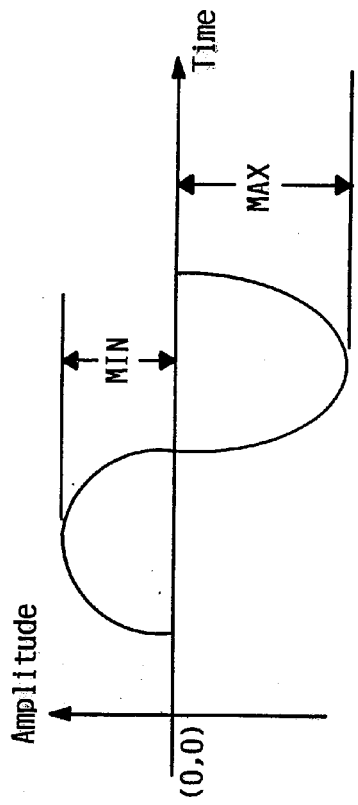
FIG. 2 illustrates the waveform of an example of negative asymmetry.

FIG. 1 illustrates a block diagram of a magneto-resistive head asymmetry correction arrangement according to an exemplary embodiment of the present invention. In the block diagram of FIG. 1, the MR Asymmetry Correction Circuit block 101 is placed between the Variable Gain Amplifier 102 and the Low Pass Filter 103 in the read path of the channel of a disk drive having an MR Head 104. As illustrated, the magneto-resistive head read channel includes a magneto-resistive head 104, a preamplifier 105 coupled to receive a read signal from the head 104 and output a preamplified read signal, a variable gain amplifier 102 coupled to receive the preamplified signal and output an amplified read signal, an asymmetry correction circuit 101 coupled to receive the amplified read signal and output a corrected read signal, a low-pass filter 103 coupled to receive the corrected read signal and output a filtered read signal, and an analog-to-digital converter 106 coupled to receive the filtered read signal and output a digital signal representative thereof.

The implementation of an exemplary embodiment is well-suited for a read channel in BICMOS technology because of its range of correction and the size of the actual circuits. The implementation of the exemplary embodiment has been shown to be effective in both laboratory and simulation experiments. The exemplary embodiment advantageously increases magneto-resistive (MR) head yield since placing the circuit in the read path tolerates larger head asymmetries and is capable of obtaining acceptable error rates on drives. By being able to ship heads with larger asymmetry, component yield can be increased. In contrast with some prior arrangements, the present invention advantageously does not involve changing biasing conditions in the magneto-resistive (MR) head. Instead, the exemplary embodiment uses a novel way of analog wave shaping by employing non-linear and linear differential stages in the read channel. Also, in contrast to other known asymmetry correction circuits, which depend on matching delay lines for their correction to work, and exemplary embodiment of the present invention does not require matching delay lines. Therefore, the performance of the exemplary embodiment of the present invention is independent of layout and process parameters which are hard to control.

The concept implemented in the MR asymmetry correction circuit 101 according to the exemplary embodiment of the invention will now be explained. The MR asymmetry correction circuit 101 according to the exemplary embodiment of the invention has two basic modes of operation. The first one is normal mode when the circuit 101 passes the signal with a symmetrical gain of approximately one. The second one is correction mode where correction is applied in the form of current to the signal to make it symmetric.

Figure 3:
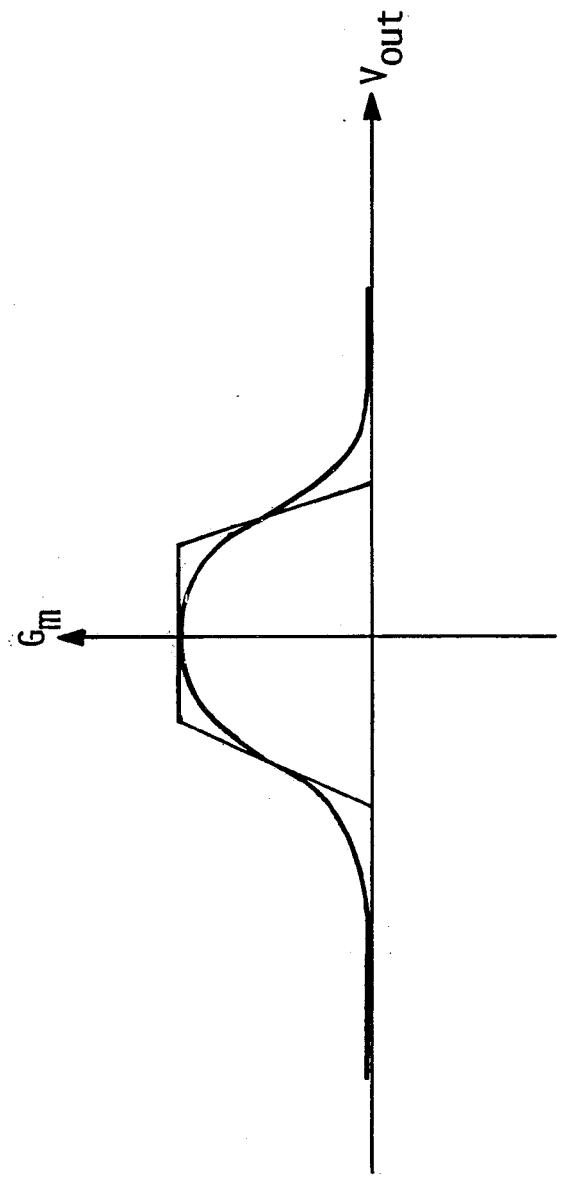
FIG. 3 illustrates a typical transconductance (GM) characteristic of a linearized bipolar differential pair.

An idea on which this asymmetry correction circuit is based is that differential bipolar pairs have certain transconductance (GM) characteristics which can be changed by preferentially adding current to one side of the differential pair. A typical characteristic of a linearized 1:4:4:1 bipolar differential pair is shown below in FIG. 3. (See also James R. Schmook, "An Input Stage Transconductance Reduction Technique for High-Slew Rate Operational Amplifiers," IEEE Journal of Solid-State Circuits, vol. SC-10, pp. 407–411, December 1975.)

Figure 4:
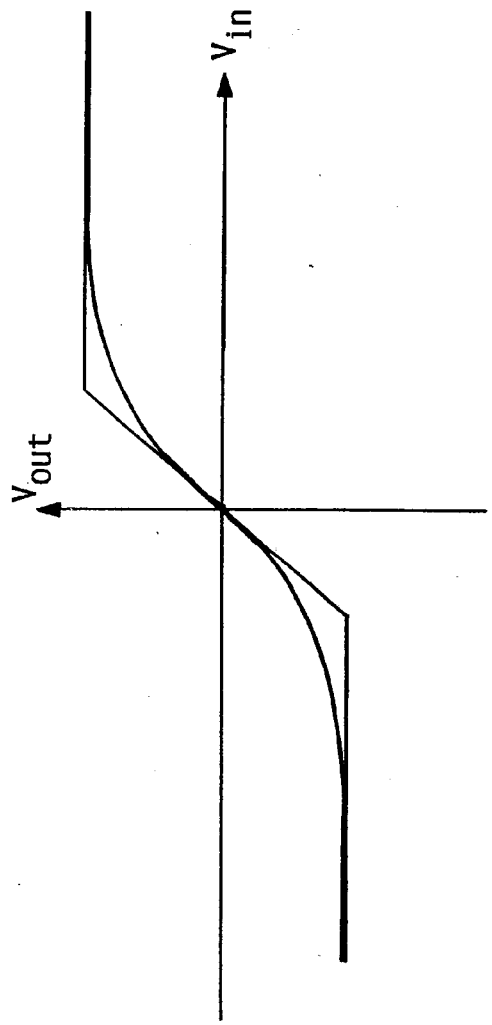
FIG. 4 illustrates a Vout vs Vin characteristic obtained from a linearized differential pair having the GM characteristic of FIG. 3.
Figure 5:
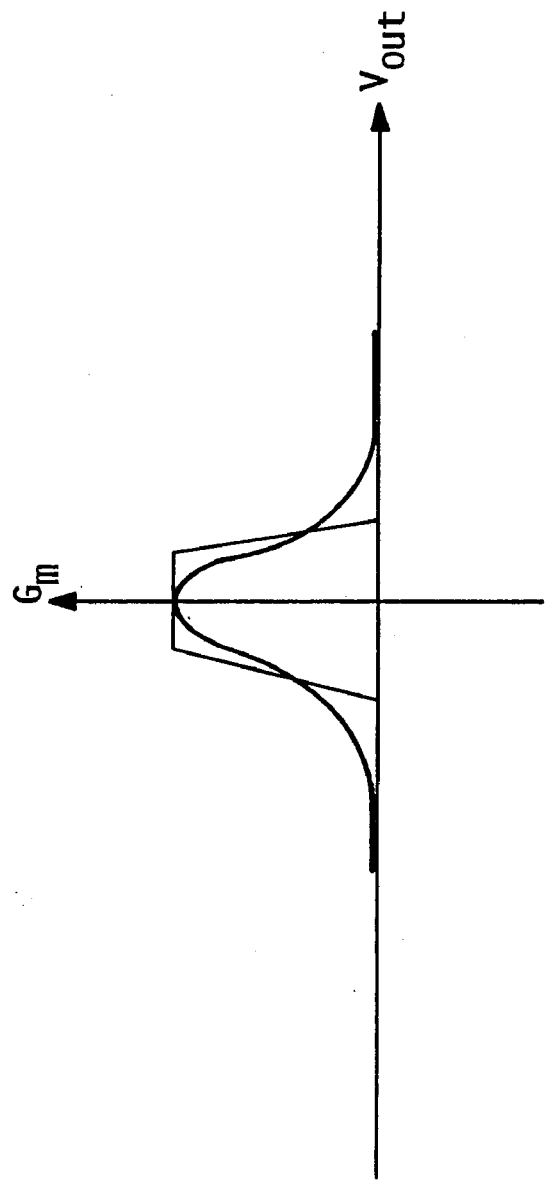
FIG. 5 illustrates a typical GM characteristic of a non-linearized bipolar differential pair.
Figure 6:
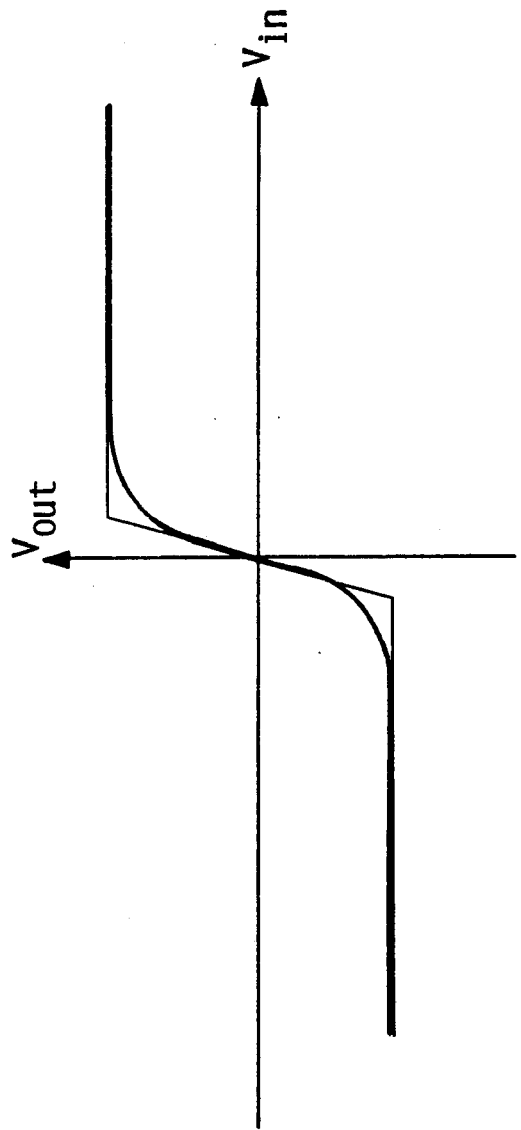
FIG. 6 illustrates the Vout vs Vin characteristic obtained from the non-linearized differential pair having the GM characteristic of FIG. 5.

When a signal passes through, such a linearized differential pair the Vout vs Vin obtained is shown in FIG. 4. So an input signal would be symmetric with respect to Vin=0V When the differential pair is non-linearized, the GM characteristics is shown in FIG. 5. The linear range for such a differential pair is much smaller, as can be seen from FIG. 5. FIG. 6 illustrates the Vout vs Vin characteristic obtained from the non-linearized differential pair having the GM characteristic of FIG. 5. It can be shown that by combining these effects, one can correct an asymmetric waveform.

Figure 7A:
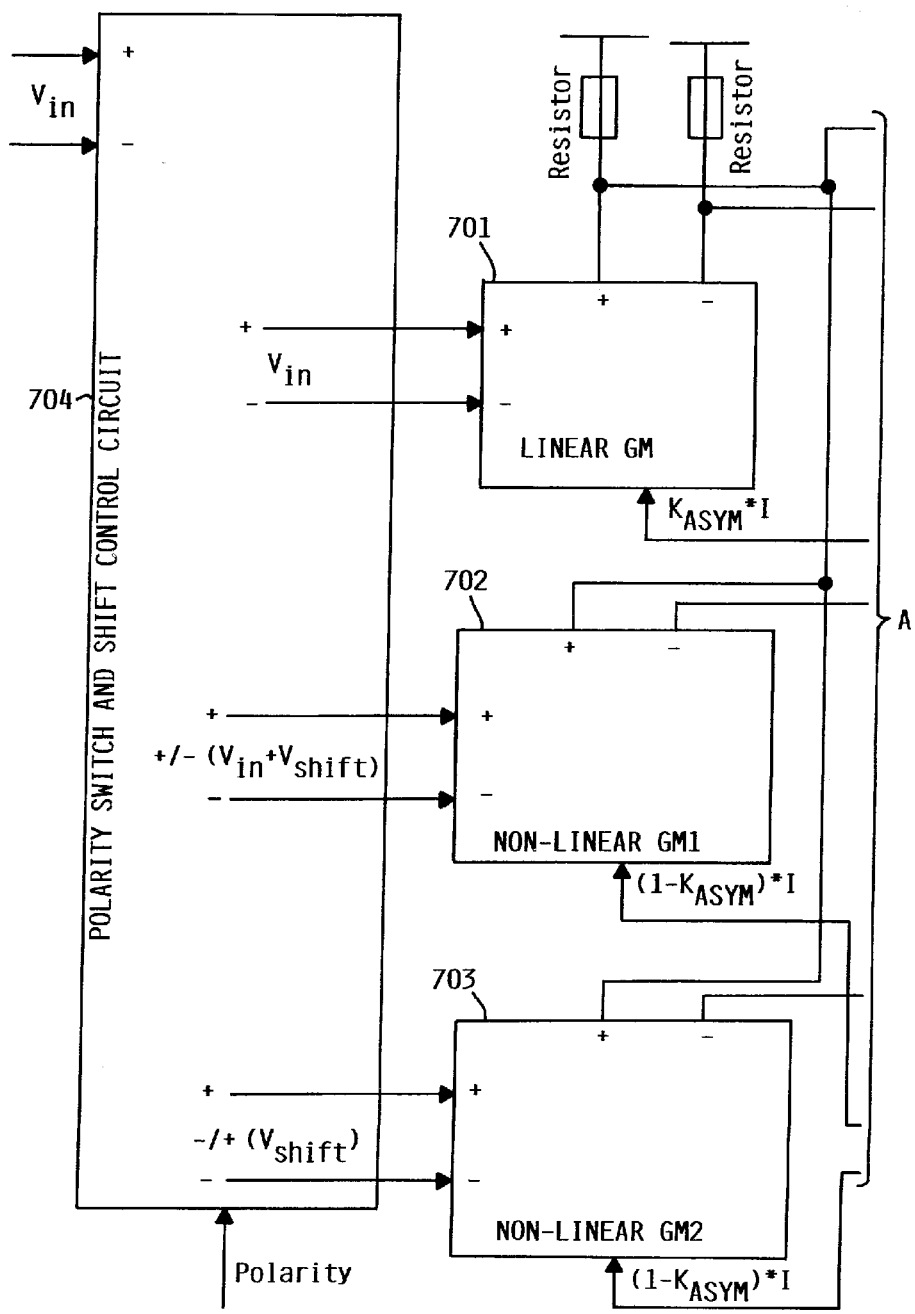
FIG. 7 illustrates is a block diagram representation of the magneto-resistive (MR) head asymmetry correction circuit of FIG. 1 according to an exemplary embodiment of the invention.
Figure 7B:
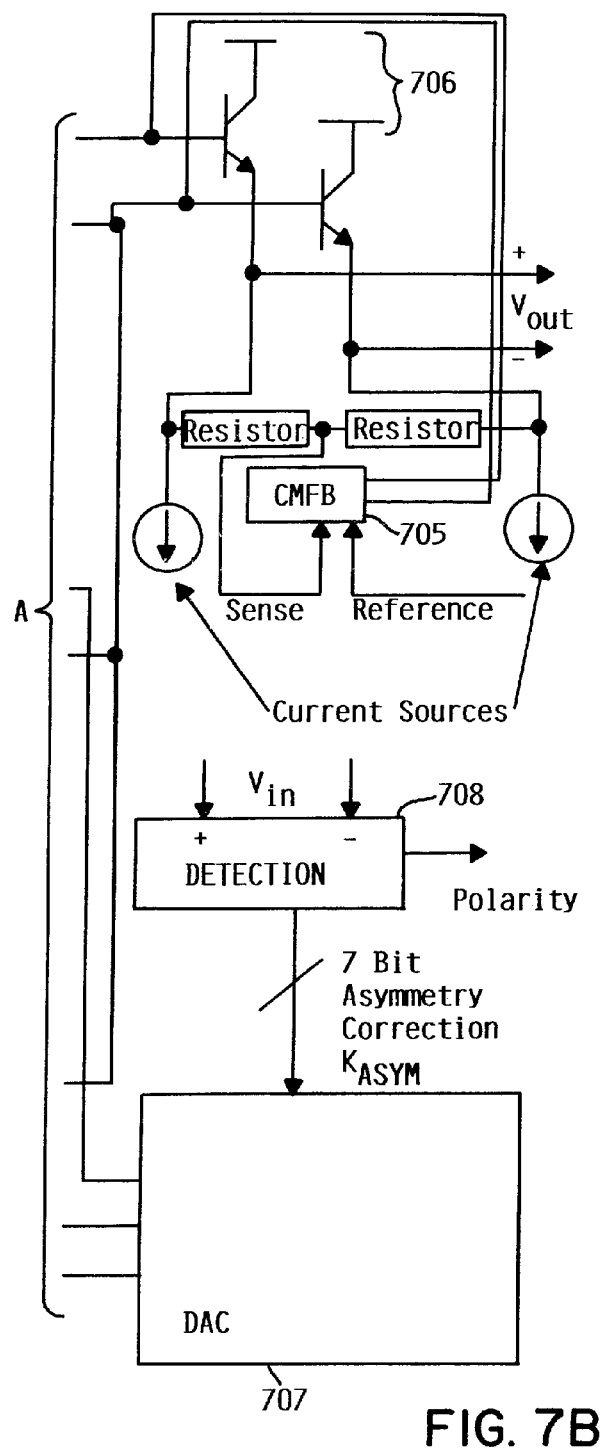

An exemplary circuit implementation of the inventive concept described above will now be described with reference to FIG. 7. FIG. 7 is a block diagram representation of the MR asymmetry adjust circuit block 101 of FIG. 1, according to an exemplary embodiment of the invention.

In overview, and with reference to FIG. 7, the circuit arrangement for correcting magneto-resistive head asymmetry includes a shift circuit 704 which receives a read signal ($V_{in}$) from a magneto-resistive head, and an input control signal (Polarity) based on a detection of the polarity of any asymmetry of the read signal. Depending on the polarity of the asymmetry, the shift circuit 704 either adds or subtracts a shift voltage to the read signal to produce a shifted read signal. The shift circuit 704 outputs the read signal, the shifted read signal, and the shift voltage. First, second and third gain circuits 701, 702, 703 are provided, which receive the read signal, the shifted read signal, and the shift voltage, respectively, and which each receive a respective control signal from digital-to-analog converter (DAC) 707. The first, second and third gain circuits 701, 702, 703 provide respective outputs amplified proportionally based on the respective control signals received.

Detection circuitry 708 detects any asymmetry in the read signal $V_{in}$ and its polarity, and provides the respective control signals to the polarity switch and shift control circuit 704, and to the first, second and third gain circuits 701, 702, 703, via the DAC 707, based on an amount of correction required. The detection circuit may include therein a digital control loop, and the amount of correction required could be determined by the digital control loop, for example. This detection circuitry 708 could take any number of other forms, as would be apparent to one skilled in the art. For example, the read signal output of the variable gain amplifier/continuous time filter (VGA/CTF) could be digitized by an analog-to-digital converter (ADC), and the number of gated samples recorded manually. Then, the proper amount of correction could be applied to the analog asymmetry correction circuitry via the DAC 707. The amount of correction could be based on a complex mathematical calculation of the head asymmetry, based on the gated samples. This entire control process could be done manually, however, it could also be fully automated in future generations of read channels. Such a fully automated modification is not described herein since it is not necessary for a complete understanding of the invention, and forms the subject matter of a further patent application.

A common-mode-feedback circuit (CMFB) 705 adjusts for changes in the common-mode caused by the waveform shaping.

Considering the embodiment in more detail, the magneto-resistive head read signal (from the variable gain amplifier), shown in FIG. 7 as $V_{in}$, is processed in two ways. In one case the signal is passed through unaltered through the linear GM block 701, while in the other case certain amount of correction is applied in non-linear GM1 block 702, shown in FIG. 7 as $V_{shift}$. Since the asymmetry circuit adds dc current to one side of the GM vs Vin curve, a dc offset is induced during the correction.

Therefore, a second non-linearized differential pair, i.e., the non-linear GM2 block 703, which has no signal applied to it, is used to cancel this effect. The polarity switch and shift control circuit block 704 of FIG. 7 is used to apply correction to either the positive or the negative signal. The outputs of these three differential pairs, i.e., the linear GM block 701, and the non-linear GM1 and GM2 blocks 702 and 703, are then summed and connected to the common mode feedback circuit (CMFB) 705 using emitter followers 706

The currents in all the differential pairs are controlled by the DAC block 707. This current changes based on the amount of correction needed for the signal. The amount of correction is determined through a digital control loop. The circuit shown in FIG. 7 can correct asymmetries of up to 40% in simulation and in lab evaluation.

Figure 8:
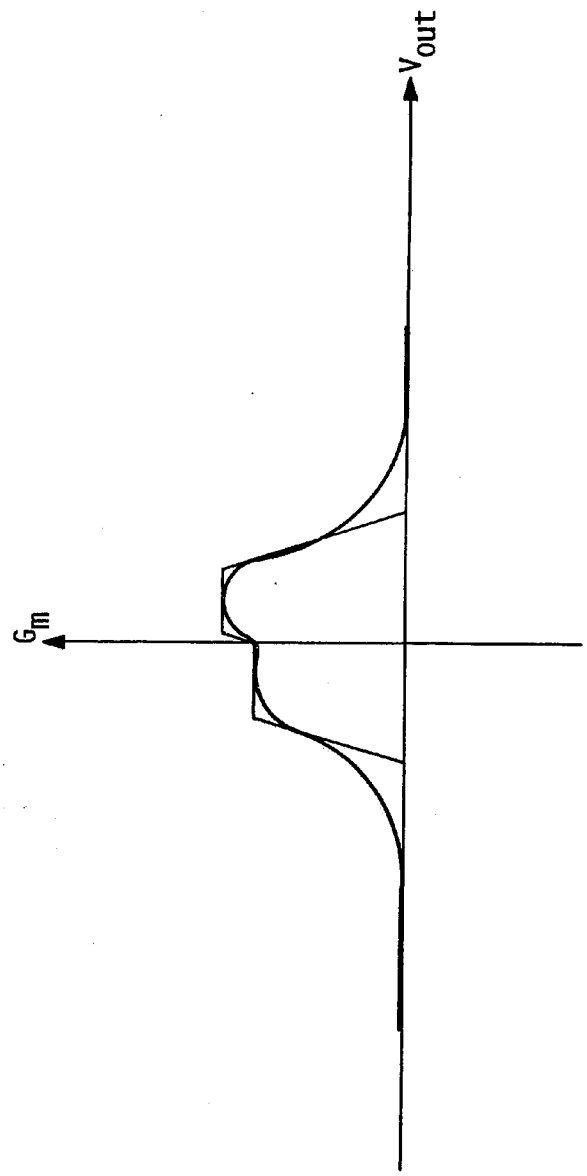
FIG. 8 illustrates the GM characteristic of a non-linearized differential pair which has been shifted up and added to a linearized differential pair for positive correction (negative asymmetry).
Figure 9:
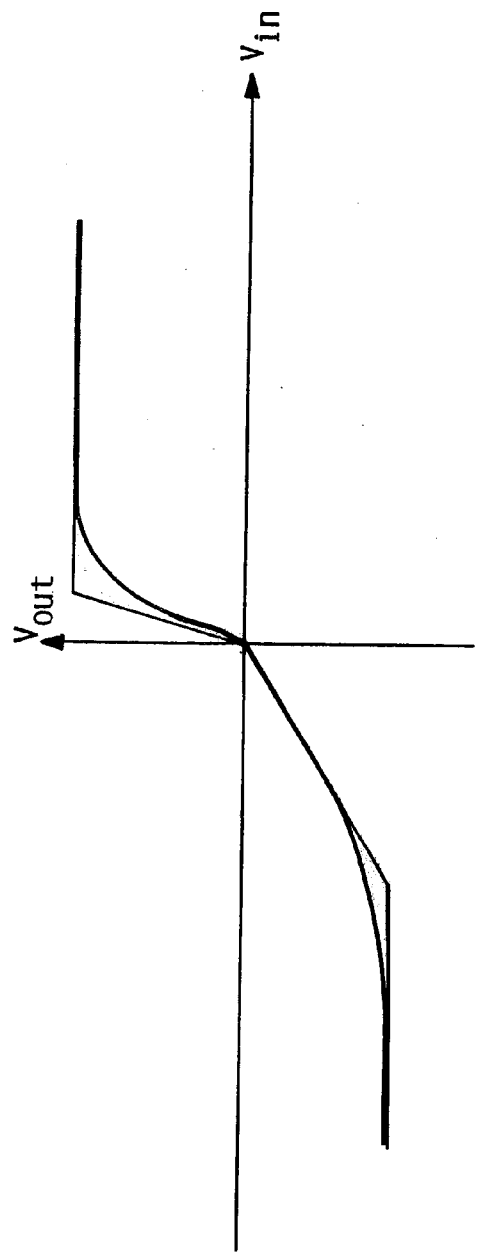
FIG. 9 illustrates the Vout vs. Vin characteristic of the differential pair having the GM characteristic of FIG. 8 for positive correction (negative asymmetry).
Figure 10:
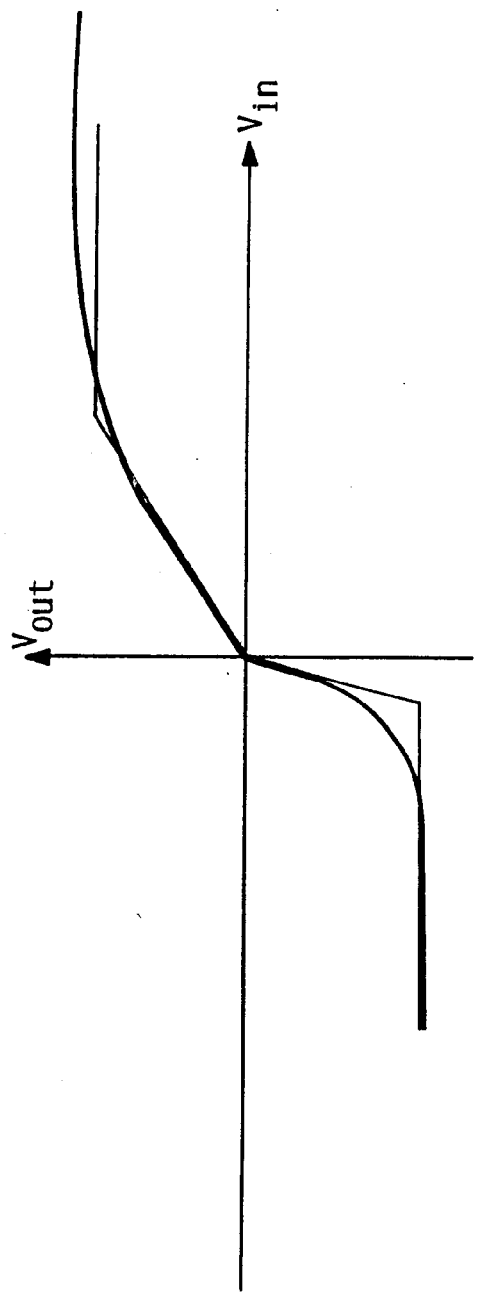
FIG. 10 illustrates the Vout vs Vin characteristic for negative correction (positive asymmetry).

When a non-linearized differential pair is shifted up and added to a linearized differential pair a GM characteristic such as the one shown in FIG. 8 can be created. Thus, the Vout vs. Vin characteristic of the differential pair gets altered to look like it does in FIG. 9. Because the gradient on the right side of the y-axis is greater than on the left, this differential pair can increase the positive portion of a signal coming in while keeping the negative the same. This would be called positive correction (negative asymmetry) and applied to a signal which a positive side amplitude smaller than the negative amplitude. The Vout vs. Vin characteristic for negative correction (positive asymmetry) is shown in FIG. 10.

Since a bipolar differential pair, for example, has limited linear range, the pair is replaced by a 4:1 1:4 differential pair. This method of correcting asymmetry can be thought of adding the GM characteristics of two differential pairs. Depending on the magnitude and the direction of correction needed, the GM characteristic can be applied on either side, and at an appropriate current.

When an asymmetric signal comes into this circuit, the polarity of asymmetry, positive or negative, is obtained from a measurement. Depending on the polarity of the asymmetry, the $V_{Shift}$ is either added or subtracted from the signal. This shift applied by the non-linear GM1 stage 702 changes the dc point of the linear stage 701. The non-linear GM2 stage 703 applies a dc shift which is equal to the one from GM1 702, but opposite sign so that the linear stage 701 has the same dc level.

Subsequently, the control signal $K_{ASYM}$ is applied to the digital-to-analog converter (DAC) 707, and started to increase until most of the asymmetry in the read signal is gone. As $K_{ASYM}$ is increased, more of the linear characteristic and less non-linear characteristic is applied to do the waveform shaping. Since this changes the current through the load resistors in the linear stage 701, the common-mode of the linear stage moves. A common mode feedback (CMFB) circuit 705 corrects the common mode of the MR correction circuit output ($V_{out}$) going into the Low Pass Filter 103 (see also FIG. 1).

It will be apparent to one skilled in the art that the manner of making and using the claimed invention has been adequately disclosed in the above-written description of the preferred embodiment(s) taken with the drawings.

It will be understood that the above described preferred embodiment(s) of the present invention are susceptible to various modifications, changes, and adaptations, and the same are intended to be comprehended within the meaning and range of equivalents of the appended claims.

Although equivalent components may have been mentioned herein which could be used in place of the components illustrated and described in the preferred embodiment(s), this is not meant to be an exhaustive treatment of all possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

For example, although the above-described embodiment was based on the idea that differential bipolar pairs have certain transconductance (GM) characteristics which can be changed by preferentially adding current to one side of the differential pair, one skilled in the art would understand that the invention is not limited to gain stages using differential bipolar pairs. Any type of differential gain stage could be used, e.g., having field effect transistors, so long as the gain of one side r the other of the differential pair can be adjusted.

What is claimed is:

1. An arrangement for correcting magneto-resistive head asymmetry, comprising:
    a shift circuit which receives a magneto-resistive head read signal, and a polarity signal indicative of the polarity of any asymmetry of the read signal;
        wherein, depending on the polarity of the asymmetry, the shift circuit either adds or subtracts a shift value to the read signal to produce a shifted read signal;
        wherein the shift circuit outputs the read signal, the shifted read signal, and the shift value; and
    first, second and third gain circuits, which receive the read signal, the shifted read signal, and the shift value, respectively, and which each receive a respective control signal;
        wherein the first, second and third gain circuits provide respective outputs amplified in accordance with the respective control signals.

2. The arrangement according to claim 1, wherein the respective control signals and the polarity signal are derived from the read signal by control means, the control means receiving the read signal, detecting a polarity of any asymmetry of the read signal, and providing the polarity signal to the shift circuit and the respective control signals to the first, second and third gain circuits, based on an amount of correction required.

3. A method of correcting asymmetry in a read signal from a magneto-resistive head, comprising utilizing the arrangement according to claim 2.

4. The arrangement according to claim 1, further comprising common mode adjustment means for receiving the respective outputs from the first, second and third gain circuits, as a combined output, and for correcting any common mode effect in the combined output.

5. The arrangement according to claim 4, wherein the common mode adjustment means comprises a common mode feedback circuit.

6. The arrangement according to claim 4, further comprising a pair of emitter followers for receiving the respective outputs from the first, second and third gain circuits, and providing the combined output to the common mode adjustment means.

7. A method of correcting asymmetry in a read signal from a magneto-resistive head, comprising utilizing the arrangement according to claim 4.

8. The arrangement according to claim 1, wherein the respective control signals and the polarity signal are derived from the read signal by control means, the control means receiving the read signal, detecting a polarity of any asymmetry of the read signal, and providing the polarity signal to the shift circuit and the respective control signals to the first, second and third gain circuits, based on an amount of correction required;
    wherein the control means comprises:
        detection means for receiving the read signal, detecting any asymmetry in the received read signal and the polarity of any asymmetry, producing the polarity signal, and producing a digital correction signal indicative of an amount of asymmetry correction required; and
        a digital to analog converter for receiving the digital correction signal and producing the respective control signals to the first, second and third gain circuits, based on an amount of correction required.

9. A method of correcting asymmetry in a read signal from a magneto-resistive head, comprising utilizing the arrangement according to claim 8.

10. A method of correcting asymmetry in a read signal from a magneto-resistive head, comprising utilizing the arrangement according to claim 1.

11. The arrangement according to claim 1, wherein the first, second and third gain circuits comprise differential amplifier pairs having certain transconductance characteristics which can be changed by adding current to one side of the differential pair.

12. The arrangement according to claim 11, wherein the first, second and third gain circuits comprise differential bipolar transistor pairs.

13. A method of correcting asymmetry in a read signal from a magneto-resistive head, comprising:
    detecting an amount of asymmetry in the read signal, and the polarity of the asymmetry detected; and
    producing a corrected read signal by combining the outputs of first second and third gain stages, the first gain stage being a linear gain stage which receives the read signal unaltered, the second gain stage being a non-linear gain stage which receives the read signal altered by a shift value in accordance with the polarity of the asymmetry detected, and the third gain stage receiving the shift value, the gain stages having a respective gain thereof controlled based on the asymmetry detected.

14. In a magneto-resistive head read channel, an arrangement for correcting any asymmetry in a read signal comprising:
    detection means for detecting any asymmetry in the read signal and the polarity thereof; and
    correction means for correcting any detected asymmetry of the read signal based on the detection means, the correction means comprising:

polarity switch and shift control circuit means which receives the read signal and an asymmetry polarity control signal from the detection means, and which output the read signal, a shifted read signal, and a shift signal;

first, second and third gain means, which receive as input the read signal, the shifted read signal, and the shift signal, respectively, from the polarity switch and shift control circuit means, and which each receive a respective separate gain control signal which adjusts an amount of amplification applied to produce a respective output; and combination means for receiving the respective outputs from the first, second and third gain means, combining the respective outputs into a combined output, and adjusting for any common mode effect in the combined output.

15. The arrangement according to claim 14, wherein the correction means further comprises digital to analog converter means for receiving a digital signal from the detection means indicative of an amount of asymmetry in the read signal, and for providing the respective gain control signals to the first, second and third gain means, based on the digital signal received.

16. The arrangement according to claim 14, wherein the first, second and third gain means comprise differential amplifier pairs having certain transconductance characteristics which can be changed by adding current to one side of the differential pair.

17. The arrangement according to claim 16, wherein the first, second and third gain circuits comprise differential bipolar pairs.

* * * * *

UNITED STATES PATENT AND TRADEMARK OFFICE
CERTIFICATE OF CORRECTION

PATENT NO. : 6,400,518 B1
DATED : June 4, 2002
INVENTOR(S) : Jaydip Bhaumik, Robert Andrew Kertis, Klaas Berend Klaassen, Raymond Alan Richetta and Jacobus Cornelis Leonardus Van Peppen It is certified that error appears in the above-identified patent and that said Letters Patent is hereby corrected as shown below:

Title page,
The title page showing an illustrative figure should be deleted and substitute therefor the attached title page.

Drawings,
Delete Figures 1, 2, 3, 4, 5, 6, 7, 8, 9 and 10 and substitute therefor the Drawing sheets, consisting of Figures 1-10, as shown on the attached pages.

Signed and Sealed this

Eighth Day of October, 2002

Attest:

Attesting Officer

JAMES E. ROGAN
Director of the United States Patent and Trademark Office

(12) United States Patent
Bhaumik et al.

(10) Patent No.: US 6,400,518 B1
(45) Date of Patent: Jun. 4, 2002

(54) MAGNETO-RESISTIVE ASYMMETRY CORRECTION CIRCUIT

(75) Inventors: Jaydip Bhaumik; Robert Andrew Kertis, both of Rochester, MN (US); Klaas Berend Klaassen, San Jose, CA (US); Raymond Alan Richetta, Rochester, MN (US); Jacobus Cornelis Leonardus Van Peppen, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/702,618

(22) Filed: Nov. 1, 2000

(51) Int. Cl.$^7$ .................................................. G11B 5/02

(52) U.S. Cl. ........................... 360/25; 360/46; 360/67
(58) Field of Search ........................... 360/25, 46, 67, 360/53

(56) References Cited

U.S. PATENT DOCUMENTS

| | | |
|---|---|---|
| 5,787,005 A | 7/1998 | Millerd, Jr. et al. |
| 5,943,177 A | 8/1999 | Mathews et al. |
| 5,986,831 A | 11/1999 | Muto |
| 5,999,349 A | 12/1999 | Choi |
| 6,043,943 A | 3/2000 | Rezzi et al. |
| 6,052,245 A | 4/2000 | Sugawara et al. |
| 6,072,647 A | 6/2000 | Hiramatsu |
| 6,191,908 B1 * | 2/2001 | Tachiyawa .................. 360/67 |

FOREIGN PATENT DOCUMENTS

| | | |
|---|---|---|
| JP | 6231410 | 8/1994 |
| JP | 10214403 | 8/1998 |

OTHER PUBLICATIONS

"An Input Stage Transconductance Reduction Technique for High–Slew Rate Operational Amplifiers", IEEE Journal of Solid–State Circuits, By Schmook, vol. SC–10, No. 6, Dec. 1975, pp. 407–411.*

* cited by examiner

*Primary Examiner*—Alan T. Faber
(74) *Attorney, Agent, or Firm*—Christopher H. Lynt; James R. Nock

(57) ABSTRACT

A circuit arrangement for correcting magneto-resistive head asymmetry includes a shift circuit which receives a read signal from a magneto-resistive head, and a polarity signal indicative of the polarity of any asymmetry of the read signal. Depending on the polarity of the asymmetry, the shift circuit either adds or subtracts a shift voltage to the read signal to produce a shifted read signal. The shift circuit outputs the read signal, the shifted read signal, and the shift voltage. First, second and third gain circuits are provided, which receive the read signal, the shifted read signal, and the shift voltage, respectively, and which each receive a respective control signal. The first, second and third gain circuits provide respective outputs amplified proportionally based on the respective control signals. Control circuitry provides the polarity signal to the shift circuit and the respective control signals to the first, second and third gain circuits, based on an amount of correction required. A common-mode-feedback circuit adjusts for changes in the common-mode caused by the waveform shaping.

17 Claims, 4 Drawing Sheets

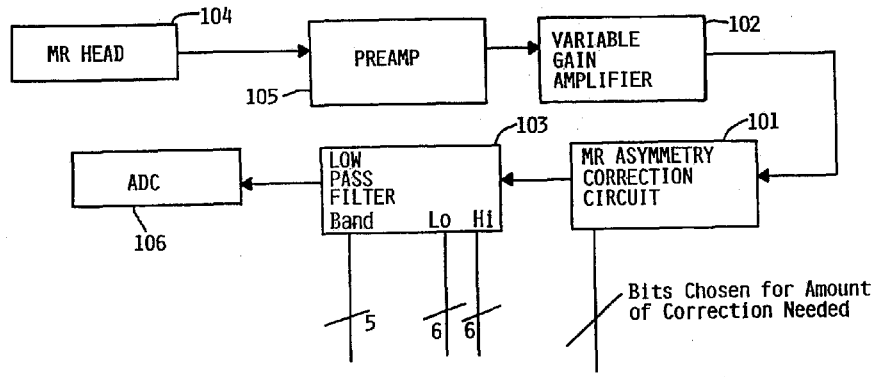

MR ASYMMETRY CORRECTION DIAGRAM

NEGATIVE ASYMMETRY

Asymmetry of a waveform such as the one shown below is given by the equation:

$$\text{Asymmetry} = \left(\frac{\text{MAX}-\text{MIN}}{\text{MAX}}\right)$$